United States Patent [19]

Miselem Asfura

[11] E Re. 29,790

[45] Reissued Oct. 3, 1978

[54] PROCESS FOR HANDLING FLUIDS IN HEAT TRANSFER EQUIPMENT

[76] Inventor: Abraham C. Miselem Asfura, Pachuca No. 87-102, Mexico City, D.F., Mexico

[21] Appl. No.: 503,626

[22] Filed: Sep. 6, 1974

Related U.S. Patent Documents

Reissue of:

[64] Patent No.: 3,828,843
Issued: Aug. 13, 1974
Appl. No.: 322,198
Filed: Jan. 9, 1973

[51] Int. Cl.[2] ..... F26B 13/18

[52] U.S. Cl. ..... 165/1; 34/119; 165/89

[58] Field of Search ..... 34/73, 79, 119, 124; 165/111, 89

[56] References Cited

U.S. PATENT DOCUMENTS

| | | | |
|---|---|---|---|
| 1,457,779 | 6/1923 | Liebeck | 34/119 |
| 1,531,744 | 3/1925 | Farnsworth | 34/119 |
| 1,575,615 | 3/1926 | Broughton | 34/119 |
| 1,737,926 | 12/1929 | Ireland | 34/119 |
| 2,049,050 | 11/1957 | Cram | 34/119 |
| 2,142,037 | 12/1938 | Stamm | 34/119 |
| 2,811,787 | 11/1957 | Clements | 34/119 |
| 2,952,297 | 9/1960 | Hollis | 34/119 |
| 3,251,138 | 5/1966 | Whittaker | 34/119 |

FOREIGN PATENT DOCUMENTS

| | | | |
|---|---|---|---|
| 1,164,384 | 9/1969 | United Kingdom | 34/119 |

*Primary Examiner*—Charles J. Myhre
*Assistant Examiner*—Margaret A. LaTulip
*Attorney, Agent, or Firm*—Hopgood, Calimafde, Kalil, Blaustein & Lieberman

[57] ABSTRACT

This invention provides a novel process of handling fluids which increase heat transfer efficiency in all types of heat transmission equipment. This process is applicable both to single and multiple units; in both cases, heat transfer is enhanced and steam consumption reduced.

Basically, the process consists in extracting, along with the condensate, some of the steam from inside of a steam heated unit, separating this steam from the condensate and noncondensable gases, before and after feeding this extraction steam to another units working at a lower pressure.

12 Claims, 1 Drawing Figure

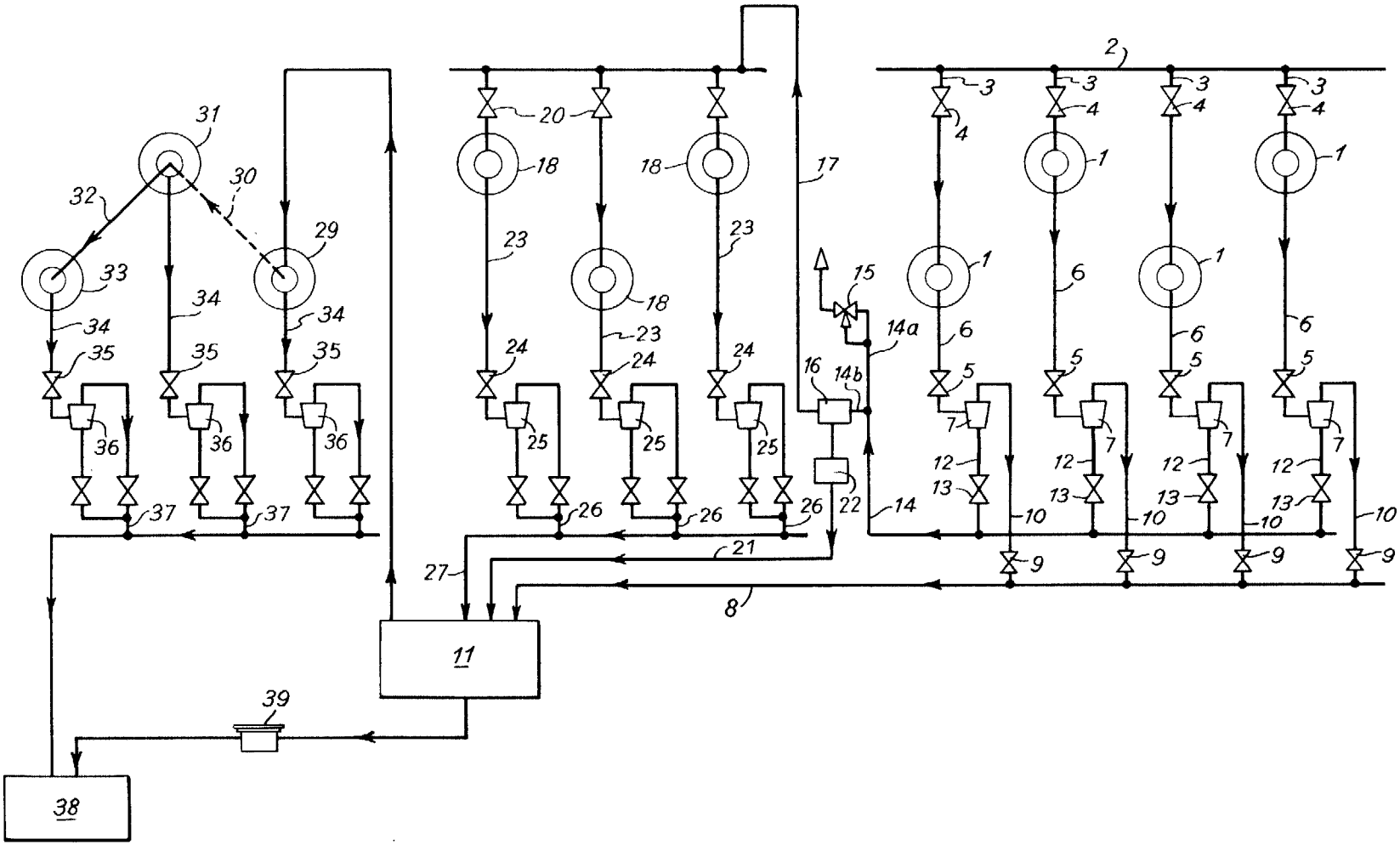
1
2
3
4
5
6
7
8
9
10
11
12
13
14
14a
14b
15
16
17
18
20
21
22
23
24
25
26
27
29
30
31
32
33
34
35
36
37
38
39

PROCESS FOR HANDLING FLUIDS IN HEAT TRANSFER EQUIPMENT

Matter enclosed in heavy brackets [ ] appears in the original patent but forms no part of this reissue specification; matter printed in italics indicates the additions made by reissue.

BACKGROUND OF THE INVENTION

In all of those industrial equipments and systems, utilizing steam as a heat transfer medium, there is a constant search for improved efficiency in all parts, in order to reduce operating costs. To do it, piping is insulated, leaks are eliminated, etc., nevertheless, there are always losses which reduce efficiency and increase costs.

It is one of the objects of this invention to provide a procedure for handling fluids in heat transfer equipment, that increases efficiency and is applicable to individual or multiple units.

One additional object of the invention is to provide a process for extracting steam from a heat transfer unit, separating it from the condensate and non-condensable gases, and reutilizing it in another unit at a lower pressure than the previous one.

Another important object of the invention is the extraction of non-condensable gases from inside of a unit. It is well known, among the skilled in the art, that it is necessary to extract certain amount of "live" steam in order to extract non-condensable gases. The process makes use of devices to separate the non-condensables from the extraction steam, before and after utilizing this steam in other heat transfer units or as a humidifying medium.

The new process can be applied to any type of steam heated equipment and, in this description, the novel process of this invention, will be described as applied to a machine for paper and which consists of several rotating cylinders, or dryers, heated with steam. However, reference is made to the paper machine installation, only as a practical example of the application of said procedure, but in no case to limit its field of application, which field is universal, as the process is applicable to any industry or equipment that utilizes steam.

SUMMARY OF THE INVENTION

The novel process for handling fluids in heat transfer equipment, of this invention, basically consists in supplying steam to a unit or units by means of common pipes. Every unit has its own steam trap, modified with a steam extraction device. The thus modified steam traps discharge the condensate to a common pipe line which carries it into a "flash Tank" described later on. Extraction steam is piped out from each modified steam trap into a common pipe header, which supplies this extraction steam, through a separator, to another group of units.

The second group of units has also individual modified steam traps, except that, in this case, both the extraction steam and the condensate are piped together to the "flash tank."

The "Flash Tank" has the purpose of supplying steam to the lowest pressure units. Since the condensate that is discharged to the "Flash Tank" is at a higher pressure, part of it flashes into steam when it enters the low pressure tank. This "Flash" steam, plus the extraction steam from the second group of units, is supplied to the lowest pressure units, thus resulting in the maximum utilization of the heat available in the fluids supplied to the machine.

It should be noticed that all of the condensate is recovered and that no steam is wasted to the atmosphere, as it is done in other conventional processes.

DESCRIPTION OF THE DRAWINGS

In relation to the attached FIGURE, which depicts a paper drying machine, composed of multiple rotary cylinder dryers, heated with steam, it can be seen that there is a first group of cylinders 1, with a common steam supply header 2 and individual branch inlets 3. Each branch has its own stop valve 4 at the inlet, and another stop valve 5, at the outlet 6. Each outlet branch pipe 6 connects to a special separating steam trap 7. This special modified steam trap 7 receives condensate and steam from the dryer cylinders 1, and it separates them, discharging the condensate through pipe 8, with a stop valve 9, to header 10 and into flash tank 11. The extracted steam is discharged through pipe 12, and stop valve 13 to header 14. This header 14 splits into two lines 14a and 14b. Line 14a goes to a thermal non-condensable gas eliminator 15 which discharges the gases to atmosphere. Second line 14b goes into a condensate separator 16, from which a header 17 supplies the extraction steam to a second group of cylinder dryers 18 by means of header 19 and stop valves 20. Condensate is drained from separator 16 by a normal steam trap 22 through piping 21 to flash tank 11.

The second group of cylinder dryers discharges through individual branch pipes 23 and stop valves 24 to special separating steam traps 25 which receive both steam and condensate. In this case, the special traps 25 discharge both condensate and extraction steam to a single pipe line 26 which discharges to header 27, (common to the second group) and finally to flash tank 11.

The flash steam produced at flash tank 11, is piped through line 28 to a third group through cylinder 29 (third in relation to the travel direction of paper on the machine). This cylinder dryer 29 operates at a lower pressure than the two groups described previously; from it, steam is extracted through pipe 30 to second cylinder dryer 31. From this second dryer 31 steam is also extracted through piping 32 to first cylinder dryer 33. This manner of supplying steam to this group of cylinders, produces an automatic pressure drop from one dryer to the next. As a result of the pressure drop, each cylinder has a lower temperature, in direction of the pressure drop, with the first cylinder in contact with the paper having the lowest temperature. The arrangement provides a temperature gradient, rising in the direction of paper travel. Regulation of the pressure at flash tank 11 permits control of the temperature of the first dryer in order to avoid sticking of the paper because of too high a temperature.

The discharge of each of these three dryers 29, 31 and 33 is through branch lines 34 and stops valves 35 to individual special separating traps 36 discharing both the condensates and the extraction steam through pipe 37 to final condensate collector tank 38 from where they are pumped to the boiler.

The condensate from the flash tank 11 is also discharged, through a normal trap 39 to the condensate collector tank 38.

The invention has been described in accordance with its preferred character, taking in consideration that it has been referred to a paper drying machine as a practical application, but with the full understanding that the procedure, subject on this invention, is in no way limited to the paper industry. Furthermore, it is understood that any variation on installations, based on the present description, will necessarily fall within the scope of the invention.

I claim:

1. Process for handling fluids in heat transfer apparatus, comprising the steps of providing a first group of heat transfer units, feeding *a flow of* steam to this first group, through a common header; connecting the outlets of said heat transfer units to first modified steam-trap units [to traps] that separate condensate and extraction steam, *thereby providing a flow of condensate separate from a flow of extraction* steam; piping the condensate flow through a common header to a flash tank and feeding the *flow of* extraction steam to a second group of heat transfer units, through a separator and an air eliminator; [in this second group of heat transfer units, the steam is passed through corresponding steam traps, but in this case the steam traps] *feeding the flow of extraction steam to the second group of heat transfer units, through a common header; connecting the outlets of the second group of heat-transfer units to second steam modified traps, the second steam traps being connected to* discharge, both the extraction steam and the condensate, together through a header to the flash tank; *connecting* said flash tank *to feed* [feeds] the flash steam through a pipe to one of the heat transfer units of a third group, that operates at the lowest pressure of all groups; [from this unit, steam is extracted to the next unit and from the latter to a third unit,] *extracting steam from said one unit and feeding the same to a second unit of the third group, and extracting steam from said second unit and feeding the same to a third unit of the third group,* producing by [this] *such* extraction an automatic pressure drop from one unit to the next.

2. Procedure for handling fluids in heat transfer apparatus in accordance with claim No. 1, characterized by providing a [group of steam traps] *modified steam trap* for each of the units in the third group; these traps *being connected to* discharge, both the condensate and the extraction steam together, through a pipe to a final condensate collector [that also collects the condensate that a normal trap discharges out of the flash tank], *and connecting a normal trap to receive condensate discharged from the flash tank and to supply the same to said final condensate collector.*

[3. Procedure for handling fluids in heat transfer apparatus, in accordance with claim No. 1, wherein the extraction steam is condensed in other groups of heat transfer units.]

[4. Procedure for handling fluids in heat transfer equipment, in accordance with claim No. 1, wherein individual drainage is provided for each heat transfer unit, collecting the condensates in general headers that discharge into collector tanks.]

[5. Process for multi-stage handling of fluids in plural heat-transfer stages comprising the steps of feeding steam to heat-transfer apparatus of a first of said stages; extracting an outlet flow from said first-stage apparatus, separating said flow into a line of first-stage vapor flow apart from a line of first-stage condensate flow, and feeding said first-stage vapor flow directly to heat-transfer apparatus of a second of said stages; extracting an outlet flow from said second-stage apparatus, separating said last-mentioned flow into a line of second-stage vapor flow apart from a line of second-stage condensate flow, and directly utilizing the second stage vapor flow in a third heat-transfer apparatus.]

[6. The process of claim 5, wherein in the first stage, steam is fed to a plurality of first-stage heat-transfer units, and wherein the first-stage step of separating vapor flow from condensate flow is performed individually for the respective outlet flows from the individual heat-transfer units.]

[7. The process of claim 5, wherein in the second stage, steam supplied by the first-stage vapor-flow line is fed to a plurality of second-stage heat-transfer units, and wherein the second-stage step of separating vapor flow from condensate flow is performed individually for the respective outlet flows from the individual heat-transfer units.]

8. The process of claim [6] *12,* wherein the [condensate flows separated from the outlet flows of individual heat-transfer units are fed] *last-defined step comprises feeding the separated second-stage outlet condensate and vapor flows* to a flash tank [the latter] *to generate flash steam, and* feeding flash steam to *the* third-stage heat-transfer apparatus.

9. The process of claim 8, wherein *both the first-stage and* the second-stage condensate [flow is also] *flows are* fed to the flash tank for generation of flash steam supplied to the third-stage heat-transfer apparatus.

[10. The process of claim 5, and the step of blocking said first-stage condensate flow for less than a first-stage minimum predetermined pressure differential between the pressure of the first-stage outlet flow and the pressure in the first-stage condensate line.]

[11. The process of claim 5, and the step of blocking said second-stage condensate flow for less than a second-stage minimum predetermined pressure differential between the pressure of the second-stage outlet flow and the pressure in the second-stage condensate line.]

*12. Process for multi-stage handling of fluids in plural heat-transfer stages, each of which stages comprises a plurality of heat-transfer devices, comprising the steps of feeding steam in parallel to each of a plurality of heat-transfer devices of a first of said stages; extracting a continuous outlet flow from each of said first-stage devices, separating each said flow into a line of first-stage continuous vapor flow apart from a line of first-stage condensate flow, collecting into a common first-stage vapor line the individual separated continuous vapor flows from each of said first-stage devices, collecting into a common first-stage condensate line the individual separated condensate flow from each of said first-stage devices, said common first-stage condensate line being independent of said common first-stage vapor line, and directly and continuously utilizing the continuous vapor flow in the common first-stage vapor line in a second-stage heat-transfer device.*

*13. The process according to claim 12, in which vapor flow in the common first-stage vapor line is directly utilized by parallel feeding of such vapor flow to a plurality of second-stage heat-transfer devices.*

*14. The process of claim 13, and the steps of extracting an outlet flow from each of said second-stage devices, separating each said last-mentioned flow into a line of second-stage condensate flow apart from a line of second-stage vapor flow, and utilizing separated second-stage outlet flows in a third stage of heat-transfer apparatus.*

*15. Multi-stage steam-operated apparatus, comprising a first stage of plural heat-transfer devices having parallel*

*steam-supply inlet connections, an independent outlet-flow connection for each of said first-stage devices, means including a modified steam trap in each of said outlet-flow connections for separating each outlet flow into an individual first-stage continuous vapor flow apart from an individual first-stage condensate flow, a vapor-flow header connected to receive each said individual first-stage vapor flow, a condensate header independent of said vapor-flow header and connected to receive each individual first-stage condensate flow, and a second stage of plural heat-transfer devices having steam-supply inlet connections connected for supply by said vapor-flow header.*

*16. Apparatus according to claim 15, in which each said second-stage heat-transfer device includes an independent outlet-flow connection, a second-stage outlet-flow header, individual modified steam traps connecting said second-stage header to said second-stage outlet-flow connections, and flash-steam generating means having a condensate-supply connection to said condensate header and having a vapor-supply connection to said second-stage header.*

*17. Apparatus according to claim 15, in which the connection of said vapor-flow header to the inlets of said second-stage heat-transfer devices includes a separator for separating condensate from vapor flow, the vapor flow being connected to the inlets of said second-stage heat-transfer devices, a flash tank, and means including a steam trap connecting the last-separated condensate for supply to said flash tank.*

*18. Apparatus according to claim 15, in which the connection of said vapor-flow header to the inlets of said second-stage heat-transfer devices includes an air eliminator for extracting non-condensable gas from the vapor supply to said second-stage devices.*

*19. Apparatus according to claim 15, in which said second-stage devices are serially connected for supply by said vapor-flow header, and condensate-trap means at each series interconnection.*

* * * * *